(12) United States Patent
Graham et al.

(10) Patent No.: US 9,821,267 B2
(45) Date of Patent: Nov. 21, 2017

(54) CONFIGURATIONS, SYSTEMS, AND METHODS FOR RECOVERY OF ELEMENTAL SULFUR USING A SOLVENT

(71) Applicant: FLUOR TECHNOLOGIES CORPORATION, Aliso Viejo, CA (US)

(72) Inventors: Curt Graham, Mission Viejo, CA (US); Garry Jacobs, Aliso Viejo, CA (US); Jesus Cabrera, Irvine, CA (US); Ghaith Aljazzar, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 268 days.

(21) Appl. No.: 14/508,758

(22) Filed: Oct. 7, 2014

(65) Prior Publication Data

US 2015/0096231 A1   Apr. 9, 2015

Related U.S. Application Data

(60) Provisional application No. 61/887,613, filed on Oct. 7, 2013.

(51) Int. Cl.
| | |
|---|---|
| *C10G 45/08* | (2006.01) |
| *B01D 53/14* | (2006.01) |
| *C01B 17/16* | (2006.01) |

(52) U.S. Cl.
CPC ..... *B01D 53/1493* (2013.01); *B01D 53/1418* (2013.01); *B01D 53/1425* (2013.01); *B01D 53/1456* (2013.01); *C01B 17/162* (2013.01)

(58) Field of Classification Search
CPC ........................... C10G 45/08; C10L 2290/544
See application file for complete search history.

(56) References Cited

U.S. PATENT DOCUMENTS

| | | | |
|---|---|---|---|
| 4,322,307 A | 3/1982 | Kettner | |
| 5,242,672 A | 9/1993 | Yen et al. | |
| 6,251,263 B1 | 6/2001 | Hatanaka et al. | |
| 7,988,767 B2 * | 8/2011 | Graham | B01D 53/1456 208/208 R |
| 2007/0051667 A1 | 3/2007 | Martinie et al. | |
| 2009/0095656 A1 * | 4/2009 | Kokayeff | C10G 45/02 208/60 |
| 2010/0135880 A1 | 6/2010 | Graham et al. | |

FOREIGN PATENT DOCUMENTS

WO    2015054249 A1    4/2015

OTHER PUBLICATIONS

International Application No. PCT/US2014/059492, International Search Report, dated Jan. 20, 2015, 5 pages.
International Application No. PCT/US2014/059492, Written Opinion of the International Searching Authority, dated Jan. 20, 2015, 6 pages.
International Application No. PCT/US2014/059492, International Preliminary Report on Patentability, dated Apr. 12, 2016, 7 pages.
Dai, Wei et al., "Desulfurization of transportation fuels targeting at removal of thiophene/benxothiophene", Fuel Processing Technology, 2008, vol. 89, No. 8, pp. 749-755.
Wang, Sheng-Quiang et al., "Deep desulfurization of transportation fuels by characteristic reaction resided in adsorbents", AIChE Journal, 2009, vol. 55, No. 7, pp. 1872-1881.
Saudi Arabia Patent Application No. 516370894, Notice of Decision, dated Sep. 25, 2017, 10 pages.

* cited by examiner

*Primary Examiner* — Randy Boyer
(74) *Attorney, Agent, or Firm* — Conley Rose, P.C.; Kristin Jordan Harkins

(57) ABSTRACT

Elemental sulfur carrying capacity of a hydrocarbonaceous solvent is improved by first loading the solvent with sulfur and subsequent hydrotreatment under conditions that convert at least some of the elemental sulfur in the sulfur loaded solvent to hydrogen sulfide while preserving at least 95% of the monoaromatic and polyaromatic components in the solvent.

20 Claims, 3 Drawing Sheets

|  | Raw Diesel Oil Sample[1] | Mildly Regenerated Diesel Oil | Severely Regenerated Diesel Oil |
|---|---|---|---|
| API | 26.76 | 27.37 | 27.17 |
| SG | 0.8941 | 0.8907 | 0.8918 |
| HCONS[2] | | | |
| Carbon, wt% | 84.47 | 85.08 | 85.74 |
| Hydrogen, wt% | 12.13 | 12.17 | 12.41 |
| Oxygen, % | 0.08 | 0.07 | 0.02 |
| Nitrogen, ppmw | 84 | 98 | 73 |
| Sulfur, wt% | 3.32 | 2.67 | 1.85 |
| Total Sulfur[3] | | | |
| ASRL Total Sulfur, wt% | 3.35 | 2.70 | 1.92 |
| ASRL Organic Sulfur, wt% | 2.60 | | |
| Free Sulfur[4] | | | |
| ASRL Free Sulfur, wt% | 0.75 | - | - |
| ASRL Free Sulfur, ppmw | 7500 | 190 | 10 |
| Sulfur Carrying Capacity | | | |
| Sulfur Carrying Capacity (at 5°C) | 0.607 | 0.761 | 0.692 |
| Aromatics, wt % | | | |
| Mono aromatics | 20.0 | 19.9 | 22.5 |
| Saturates | 55.5 | 55.4 | 56.4 |
| Poly aromatics | 24.5 | 24.7 | 21.1 |
| Regeneration Conditions | | | |
| Catalyst and LHSV (hr⁻¹) | | Molybdenum | Cobalt-Molybdenum |
| Elemental Sulfur Selectivity | | High | Moderate |
| Temperature, °F | | 376 | 602 |
| Pressure, psig | | 140 | 275 |

Notes:
1- Raw diesel oil sample spiked with elemental sulfur
2- Analysis using Shell Labs Analytical Methods
3- Total sulfur includes organic sulfur compounds already present in the diesel oil and spiked elemental sulfur
4- Concentration of free sulfur ($S_8+S_x$) after spiking raw diesel oil sample with elemental sulfur

Figure 2

|  | Raw #23 | 45°C | 25°C | 5°C |
|---|---|---|---|---|
| S8 | 0.000 | 1.791 | 0.697 | 0.265 |
| Sx | 0.000 | 0.854 | 0.457 | 0.342 |
| RSR | 2.440 | 2.416 | 2.105 | 2.076 |

|  | Raw #23 | 45°C | 25°C | 5°C |
|---|---|---|---|---|
| S8+Sx+RSR | 2.440 | 5.061 | 3.259 | 2.682 |
| S8+Sx | 0.000 | 2.645 | 1.154 | 0.607 |
| S8 | 0.000 | 1.791 | 0.697 | 0.265 |

Figure 3A

|  | Raw #11 | 45°C | 25°C | 5°C |
|---|---|---|---|---|
| S8 | 0.000 | 1.870 | 0.853 | 0.361 |
| Sx | 0.019 | 0.795 | 0.528 | 0.401 |
| RSR | 2.681 | 2.668 | 2.629 | 2.718 |

|  | Raw #11 | 45°C | 25°C | 5°C |
|---|---|---|---|---|
| S8+Sx+RSR | 2.700 | 5.333 | 4.010 | 3.479 |
| S8+Sx | 0.019 | 2.665 | 1.381 | 0.761 |
| S8 | 0.000 | 1.870 | 0.853 | 0.361 |

CONFIGURATIONS, SYSTEMS, AND METHODS FOR RECOVERY OF ELEMENTAL SULFUR USING A SOLVENT

This application claims priority to our copending U.S. provisional application with the Ser. No. 61/887,613, which was filed Oct. 7, 2013, and which is incorporated by reference herein.

FIELD OF THE INVENTION

The field of the invention is sulfur removal from hydrocarbons, particularly removal of elemental sulfur from sour gases of gas wells and associated gas transport systems.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Sour gas often contains significant quantities of dissolved elemental sulfur, which tends to precipitate in numerous points during transport, including the well string, the gas gathering system, and in downstream gas treating and gas processing equipment. To avoid such problems, solvents, such as hydrocarbon oils can be injected into the well string or gathering system to solubilize the sulfur into liquid phase and to thereby prevent precipitation of the elemental sulfur. Most commonly, aromatic solvents (e.g., alkyl naphthalene) are used as solvents as they typically exhibit a higher elemental sulfur solubility than paraffinic or naphthenic hydrocarbons. A typical example for such a system is described in U.S. Pat. No. 4,322,307.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

For such treatments to be economically feasible the solvents utilized for solubilization of sulfur are frequently regenerated and reused. Regeneration of sulfur laden aromatic hydrocarbon solvents is commonly achieved by contacting the rich solvent with an aqueous solution comprising an amine (e.g., ethylamine). In such systems, the sulfur is converted to a polysulfide and migrates into the aqueous phase, thereby regenerating the hydrocarbon solvent, which is then recycled. The aqueous solution containing the amine and polysulfide/sulfur is then regenerated by distillation to provide an aqueous amine solution as the overhead product and impure, molten elemental sulfur as the bottoms product. For example, U.S. Pat. No. 5,242,672 describes a typical regenerator unit. While such systems generally achieve desirable sulfur reduction in the sour gas, numerous difficulties nevertheless remain. Among other things, regeneration of the solvent using an amine solution requires significant quantities of energy for heating and pumping. Moreover, and depending on the particular sour gas, chemical stability of the amine solution may be less than desirable and require stabilizers and/or replacement of the amine. Also, the polysulfide and/or sulfur obtained from such regeneration may at least in some cases require additional processing to provide a desirable end product.

More recently, solvents utilized for solubilization of elemental sulfur have been regenerated by hydrotreating, as disclosed in U.S. Pat. No. 7,988,767. In this process, hydrocarbon solvents such as naphthenic hydrocarbons, paraffinic hydrocarbons, and aromatic hydrocarbons are treated using a hydrogenation reaction to generate hydrogen sulfide and a regenerated solvent. The hydrogen sulfide product is removed from the regenerated solvent and converted to elemental sulfur (for example, in a Claus unit), while the resulting regenerated solvent is then returned for reuse.

Unfortunately, while recycling reduces the use of solvents the expenses incurred in their purchase are still considerable. Moreover, the solubility of sulfur in such solvents is also often limited, which necessitates increased solvent use, recycling rates, and costs for associated equipment. Thus, there is still a need for economical solvent systems that are useful for elemental sulfur extraction from sour gases and that have improved elemental sulfur solubility.

SUMMARY OF THE INVENTION

The inventive subject matter is drawn to plants, systems, and methods in which a sulfur removal solvent has increased elemental sulfur carrying capacity. Most notably, the inventors discovered that preloading and hydrotreatment of certain solvents significantly increases the elemental sulfur carrying capacity as compared to the capacity before preloading and hydrotreatment of the solvents.

In one aspect of the inventive subject matter, the inventors contemplate a method of increasing the elemental sulfur carrying capacity of a sulfur removal solvent. In preferred methods, a lean hydrocarbonaceous solvent is contacted with elemental sulfur to so produce a sulfur-loaded solvent. Most typically, the lean hydrocarbonaceous solvent comprises a plurality of monoaromatic and polyaromatic components. The sulfur loaded solvent is then subjected to catalytic hydrogenation to convert at least some of the elemental sulfur to hydrogen sulfide while preserving at least 95% of the monoaromatic and polyaromatic components to so produce a conditioned solvent. It is further especially preferred that the hydrogenation step is performed using a molybdenum catalyst and/or cobalt-molybdenum catalyst at a hydrogen partial pressure of between 50-200 psia and a temperature (e.g., between 150° C. and 350° C.) such that the conditioned solvent has an elemental sulfur carrying capacity that is higher than the elemental sulfur carrying capacity of the lean hydrocarbonaceous solvent.

In further contemplated aspects, the monoaromatic and polyaromatic components are typically present in the lean hydrocarbonaceous solvent in an amount of between 35 wt % and 55 wt %, and it is especially preferred that the lean hydrocarbonaceous solvent is a diesel oil (e.g., straight run diesel oil). Where the hydrogenation step is performed at relatively mild conditions (e.g., between 170° C. to 210° C.), the catalyst is preferably a molybdenum catalyst, while more severe hydrogenation (e.g., between 295° C. and 335° C.) may use a cobalt-molybdenum catalyst. Thus, it is also preferred that the elemental sulfur carrying capacity of the conditioned solvent is at least 10% greater, and more preferably at least 20% greater than the elemental sulfur carrying capacity of the unconditioned lean hydrocarbonaceous solvent. The inventors further contemplate that light cycle oil (LCO) may be a preferred alternate solvent with even higher elemental sulfur carrying capacity than straight run diesel oil, possibly due to LCO's high aromatics content, which is typically in the range of 60-85 wt %. As such LCO is expected to be a more preferred solvent than straight run diesel oil.

Therefore, viewed from a different perspective, the inventors also contemplate a method of improving sulfur removal from a sulfur-containing production stream. In such methods, a conditioned solvent is formed by loading a lean hydrocarbonaceous solvent (preferably having a plurality of monoaromatic and polyaromatic components) with elemental sulfur to so produce an elemental sulfur-loaded solvent that is then subjected to catalytic hydrogenation. Most typically, the catalytic hydrogenation converts at least some of the elemental sulfur in the sulfur loaded solvent to hydrogen sulfide while at least 95% of the monoaromatic and polyaromatic components are preserved. It is further preferred that the conditioned solvent has an elemental sulfur carrying capacity that is higher than that of the lean hydrocarbonaceous solvent. In another step of such methods, the sulfur-containing production stream is then contacted with the conditioned solvent to produce a rich solvent and a treated production stream.

While not limiting to the inventive subject matter, it is also contemplated that the rich solvent is subjected to catalytic hydrogenation under conditions that are substantially the same as those used for the formation of the conditioned solvent, and/or that the elemental sulfur is obtained from the sulfur-containing production stream. Therefore, the conditioned solvent may comprise at least 20% of the rich solvent after catalytic hydrogenation or even entirely be the rich solvent after catalytic hydrogenation. As noted before, it is typically preferred that the catalytic hydrogenation is performed using a molybdenum catalyst at a hydrogen partial pressure of between 50-200 psia and a temperature such that the conditioned solvent has an elemental sulfur carrying capacity that is higher (e.g., at least 10% greater, or at least 20% greater) than the elemental sulfur carrying capacity of the lean hydrocarbonaceous solvent.

Consequently, the inventors also contemplate a system for removal of sulfur from sour gas. Such systems will typically include storage for a lean solvent and/or a conditioned solvent, wherein the storage is in fluid communication with a well producing a sulfur-containing gas, wherein contact between the sulfur-containing gas and the lean solvent and/or conditioned solvent produces a rich solvent. Contemplated systems further comprise a solvent hydrotreater in fluid communication with the well and the storage, wherein the hydrotreater further comprises a molybdenum catalyst and/or cobalt-molybdenum catalyst and is configured to operate at a hydrogen partial pressure of between 50-200 psia to produce the conditioned solvent that typically has a greater (e.g., at least 10% greater) elemental sulfur carrying capacity than the lean solvent.

Most preferably, the lean solvent is a hydrocarbonaceous solvent and the elemental sulfur carrying capacity of the conditioned solvent is at least 10% greater than the elemental sulfur carrying capacity of the lean hydrocarbonaceous solvent. Moreover, it is generally preferred that the hydrotreater comprises a molybdenum catalyst and the hydrotreater is configured to operate at a temperature of 170° C. to 260° C. In addition, it is contemplated that the system will also include an inlet separator and a solvent stripper that are fluidly coupled between the well and the hydrotreater. Lastly, it is contemplated that the hydrotreater and the catalyst are operable to convert at least some of the elemental sulfur in the sulfur loaded solvent to hydrogen sulfide while preserving at least 95% of the plurality of monoaromatic and polyaromatic components.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 2 is a table providing exemplary test results for unconditioned and conditioned solvents using mild and stringent hydrogenation conditions.

FIGS. 3A and 3B are tables providing exemplary test results for unconditioned (3A) and conditioned solvents (3B) with respect to various sulfur species.

DETAILED DESCRIPTION

Figure 1:
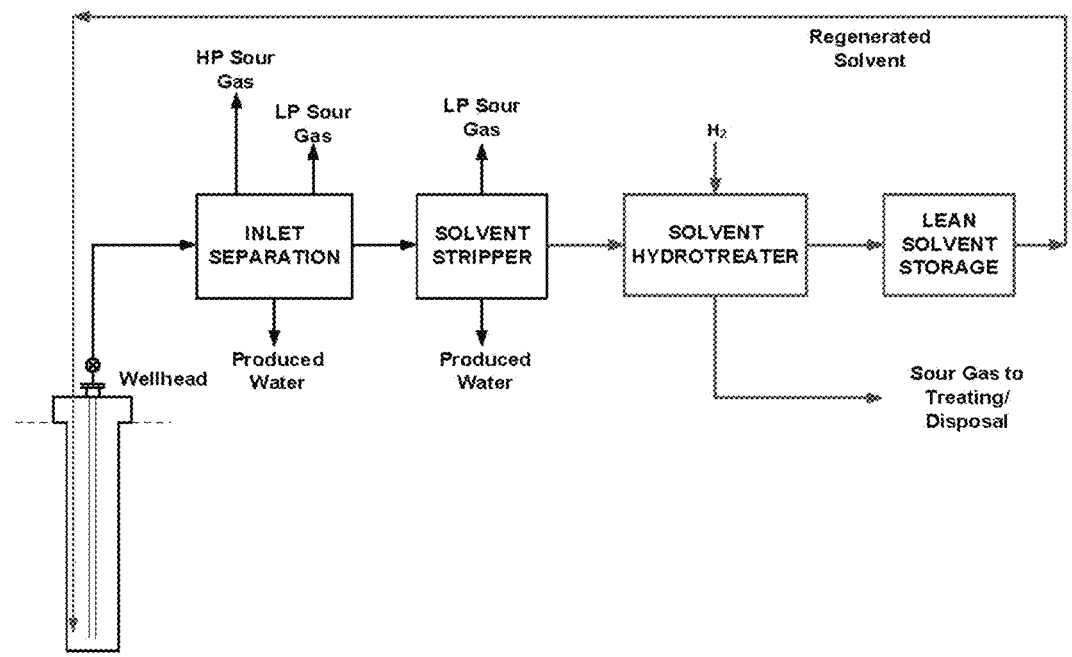
FIG. 1 is a schematic illustration of an exemplary plant configuration according to the inventive subject matter.

The inventors have discovered that conditioning of a hydrocarbonaceous solvent that is ordinarily used for solubilizing sulfur associated with sour gas will unexpectedly increase elemental sulfur carrying capacity in significant amounts. Conditioning most typically includes a step of loading the solvent first with elemental sulfur, followed by a mild hydrotreating process that substantially maintains the monoaromatic and polyaromatic components in the sulfur but reduces the sulfur to hydrogen sulfide. While not wishing to be bound by any specific theory or hypothesis, the inventors contemplate that such preconditioning step produces various organosulfides and/or organopolysulfides that will act as elemental sulfur scavenging groups in subsequent sulfur loading and hydrotreating steps. Most notably, and as described in more detail below, such conditioning will increase elemental sulfur carrying capacity at least 10%, more typically at least 20%, and most typically at least 25% as compared to unconditioned solvent.

For example, in one exemplary set of reactions using straight run diesel oil as solvent for sulfur solubilization, hydrotreating processes were performed using two different catalysts (here: molybdenum catalyst for mild conditions and cobalt-molybdenum catalyst for more severe conditions) to remove elemental sulfur from the diesel oil as hydrogen sulfide. The diesel oil was spiked with high-purity (99.5%) elemental sulfur and mixed thoroughly. Regeneration reactions were then performed on the spiked solvents at several reactor temperatures, using mild reducing conditions and more severe reducing conditions. For the mild reactions, hydrotreating reactors were operated isothermally at 375° F. (191° C.), but other temperature ranges (e.g., between 170° C. and 260° C.) are also deemed suitable, based on the prevailing activity of the selected catalyst. For more severe reactions, hydrotreating reactors were operated isothermally at 600° F. (316° C.), but other temperature ranges (e.g., between 280° C. and 350° C.) are also deemed suitable. The latter runs were conducted to simulate the impact of a high number of regeneration cycles (e.g., greater than 20 cycles, and more typically greater than 30 cycles) on the solvent's elemental sulfur carrying capacity at mild reaction conditions. The recitation of ranges of values herein is merely intended to serve as a shorthand method of referring individually to each separate value falling within the range. Unless otherwise indicated herein, each individual value is incorporated into the specification as if it were individually recited herein.

More particularly, four different mixed-bed catalyst screening hydrotreaters that shared a single reactor furnace were used and operated at the same temperature. Each of the four reactors (R1 to R4) could be operated independently with respect to feed rate, pressure, and inlet gas rate. R1 and R2 were loaded with a first catalyst, CT-1, while R3 and R4 utilized a different catalyst, CT-2.

A feed supply tank, of approximately seven gallon capacity, was provided for each unit. A blanket of nitrogen (~10 psig) was maintained on the tank and feed system to prevent evaporation and the ingress of oxygen and water vapor. Each unit was also equipped with a feed weigh tube, which was used to measure the hourly feed rate to the unit. A differential pressure cell measured the weight of the feed in the tube. The weight was logged hourly by a data acquisition system and was available for display on the local operator's console. The feed tubes were filled manually through a fill valve. The tubes were also steam-traced. The feed rate was controlled by the stroke adjustment on a micro-metering pump. The electric motor-driven pump was constant speed, therefore the feed rate was a function of stroke length.

Nitrogen and hydrogen were supplied to each unit. Nitrogen was supplied for purging air from the system before start-up, initial pressure testing, and for purging hydrogen from the system before shut-down. Hydrogen was the standard process gas. The supply hydrogen had a purity of 99.999% and was used undiluted. The hydrogen pressure to reactor units R1-R4 was reduced through a pressure regulator from 3,200 psig (221 barg) and was protected from over pressure with a pressure relief valve.

Hydrogen gas, measured by a flow meter, was fed to each unit under flow control. The hydrogen gas flowed toward the reactor where it met with the liquid feed. Together they flowed through a pre-heater, the reactor, and into a high pressure (HP) separator. In the HP separator the gas and liquid separated. The gas flowed overhead, from the separator to the bleed-off valve, which is part of the units' pressure control loop. From this point, the gas flowed to the gas-chromatograph sampling system through the bleed-off gas meter and to the low-pressure blow-down.

At six-minute intervals a data acquisition system logged the product weight. At one-hour intervals (on-the-hour) the weights were logged by the data-acquisition system and the material balance was calculated. At selected intervals, e.g., 2, 4, 8, 12, or 24 hours, the tube was drained into a product can. The product cans were placed in a hood and nitrogen gas was bubbled through the diesel oil until all dissolved hydrogen sulfide was removed (as detected using wet lead acetate paper).

Once the reactors were charged to the unit, the entire system was purged thoroughly with nitrogen. The units were then thoroughly purged with hydrogen at low pressure, then pressure was increased slowly with hydrogen, to 450 psig. The units were then gas balanced at 0.33 scf/hr at unit operating pressure. Typical results of such studies are summarized in the Table of FIG. 2. In a similar series of experiments, solubility of various forms of sulfur ($S_8$, $S_x$, RSR) at various temperatures in a diesel oil sample was characterized both before (raw #23) and after (raw #11) hydrotreating, and typical results are shown in the Tables of FIGS. 3A and 3B, respectively.

As can be taken from the data and further contemplations below, it should be appreciated that the elemental sulfur carrying capacity of both the mildly regenerated solvent and the more severely regenerated solvents were increased over that of the raw, untreated solvent. Mild regeneration conditions resulted in a greater than 25% increase in elemental sulfur carrying capacity, whereas severe regeneration conditions resulted in a greater than 14% increase in elemental sulfur carrying capacity. Such increase is thought to be due to formation of organosulfides and organopolysulfides, which may participate in elemental sulfur binding in a latter (i.e., after conditioning) sulfur loading event. Most notably, though, it should also be appreciated that both the mild and severe hydrogenation conditions were performed such that the degree of monoaromatic and polyaromatic components was not substantially affected (i.e., more than 95% were preserved). Thus, proper choice of catalyst and temperature for the lean unconditioned solvent are deemed to influence the degree of saturation and conversely the degree of increased elemental sulfur carrying capacity. For example, suitable catalysts include transition metals such as ruthenium, cobalt, molybdenum, nickel, tungsten, and/or any combination thereof, and it should be appreciated that the catalysts may or may not be supplied on a solid support, such as alumina.

While straight run diesel oil with a monoaromatic and polyaromatic content of between 35 wt % and 55 wt % was used, it should be appreciated that similar or greater improvements in elemental sulfur carrying capacity can be observed with other solvents, such as hydrocarbon mixtures of specific alkanes and alkenes, naphthenic hydrocarbons, paraffinic hydrocarbons, and/or mono-and/or polyaromatic hydrocarbons.

Therefore, and more generally speaking, the inventors also contemplate a method of increasing the elemental sulfur carrying capacity of a sulfur removal solvent using a conditioning process as described above. In such methods, it is contemplated that a lean hydrocarbonaceous solvent is first contacted with elemental sulfur (and/or other sulfur species, including various polysulfides, organosulfides, etc.) to so produce a sulfur loaded solvent. Most typically, suitable solvents will have a significant proportion of monoaromatic and polyaromatic components. For example, the content of monoaromatic and polyaromatic components may be between 10-20 wt %, 20-35 wt %, 35-55 wt %, or even higher. Thus, especially suitable solvents are light cycle oil and mixtures comprising one or more fraction of (preferably unhydrogenated) light cycle oil. All methods described herein can be performed in any suitable order unless otherwise indicated herein or otherwise clearly contradicted by context. Moreover, the use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Regardless of the particular nature of the solvent composition, it is contemplated that the so sulfur loaded solvent is then subjected to a catalytic hydrogenation step that converts at least some of the elemental sulfur (e.g., at least 30%, at least 40%, at least 60%, at least 80%, or at least 90%) to hydrogen sulfide and that preserves at least 95% of the plurality of monoaromatic and polyaromatic components to so produce a conditioned solvent. Depending on the solvent, catalyst, and hydrogen partial pressure, suitable reaction temperatures will be between 150° C. and 350° C. For example, where a more active catalyst (e.g., cobalt-molybdenum catalyst) is employed, suitable temperatures will typically be in the range of 170° C. to 210° C. On the other hand, where a less active catalyst (e.g., molybdenum catalyst) is employed, suitable temperatures will typically be in the range of 190° C. to 230° C. Of course, it should also be appreciated that the hydrogenation reaction to produce the conditioned solvent is performed at suitable hydrogen partial pressure, and in most cases suitable hydrogen partial pressures will be between 50-200 psia.

Using such conditions, increases in elemental sulfur carrying capacity of the so conditioned solvent is at least 10% greater, at least 20% greater, or at least 25% greater than the elemental sulfur carrying capacity of the lean hydrocarbonaceous solvent prior to conditioning. Most notably, it should be recognized that the conditioned solvent may be formed in part or entirely from a lean solvent that is either contacted with pure elemental sulfur in a separate processing step, or by contacting the lean solvent with sulfur from a sulfur-containing production stream. In such case, it should be recognized that the elemental sulfur carrying capacity originally calculated from the capacity of the lean solvent can be adjusted to a higher capacity, which provides substantial material savings and reduction in pumping and regeneration demands.

Therefore, and viewed from a different perspective, the inventors also contemplate a method of improving sulfur removal from a sulfur-containing production stream where a conditioned solvent is first formed from a lean hydrocarbonaceous solvent by loading the solvent with elemental sulfur (or other sulfurous species as noted above). After such loading, the sulfur loaded solvent is then subjected to catalytic hydrogenation to so form the conditioned solvent. As noted before, the catalytic hydrogenation preferably converts at least some of the elemental sulfur in the sulfur loaded solvent to hydrogen sulfide while preserving at least 95% of the plurality of monoaromatic and polyaromatic components. Following such methods, the conditioned solvent will have an elemental sulfur carrying capacity that is higher (e.g., at least 10%, or at least 20%) than that of the lean hydrocarbonaceous solvent. Once prepared, the conditioned solvent can then be contacted with a sulfur-containing production stream to thereby produce a rich solvent and a treated production stream.

It should be noted that the so formed rich solvent can be subjected to a catalytic hydrogenation under conditions that are substantially the same as those used for the formation of the conditioned solvent. Moreover, it should be appreciated that the sulfur for the sulfur loading may be wholly or in part obtained from the sulfur-containing production stream. Therefore, the conditioned solvent may comprise at least 20%, or at least 40%, or at least 60% of the rich solvent after hydrogenation. Thus, in some aspects, it should be recognized that the conditioned solvent is the rich solvent after catalytic hydrogenation.

Viewed from a different perspective, the inventors also contemplate a system for the removal of sulfur from sour gas. One exemplary system according to the inventive subject matter is shown in FIG. 1. Here, lean solvent is pumped from storage into the well site, where it mixes with sour gas (thereby solvating at least a portion of the sulfur) and returns through the well head. An inlet separation unit separates high-pressure (HP) sour gas, low-pressure (LP) sour gas, and produces water. The sulfur-laden rich solvent is then transferred to the solvent stripper where LP sour gas and water are removed prior to transfer of the stripped rich solvent to a solvent hydrotreater. As discussed in detail above, hydrogen gas is used in combination with a hydrogenation catalyst to reduce elemental sulfur to hydrogen sulfide gas, which is separated for additional treatment (e.g., Claus plant). The regenerated solvent is transferred to lean solvent storage for re-use. In a system of the inventive concept the solvent and conditions within the solvent hydrotreater are selected to improve the ability of the solvent to solvate elemental sulfur as a result of the hydrotreatment process. Thus, the regenerated solvent is the conditioned solvent for such installation. As will be readily appreciated, a variety of commercially available hydrotreating reactor configurations are suitable for use in conjunction with the teachings herein.

Consequently, yet another aspect of the inventive concept is a regenerated solvent with improved sulfur capacity for use in reducing the sulfur content of sour gas. Such a regenerated solvent can be produced by exposing a solvent to a sour gas (or other sulfur source) and allowing it to solvate at least a portion of the elemental sulfur contained therein to produce a rich solvent. This rich solvent can be subjected to catalytic hydrogenation under conditions selected to convert a least a portion of the elemental sulfur within the rich solvent to hydrogen sulfide to increase the capacity of the lean solvent thus regenerated for elemental sulfur. As noted above, suitable solvents include hydrocarbon mixtures, naphthenic hydrocarbons, paraffinic hydrocarbons, and aromatic hydrocarbons. In a preferred embodiment of the inventive concept the solvent is a diesel oil or light cycle oil. Such regenerated solvents can have an elemental sulfur carrying capacity that is about 5%, about 10%, about 15%, about 20%, about 25%, about 35%, about 50%, and/or greater than about 50% higher than that of the corresponding solvent prior to regeneration.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Lastly, as used in the description and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

What is claimed is:

1. A method of increasing elemental sulfur carrying capacity of a sulfur removal solvent, comprising:
   contacting a lean hydrocarbonaceous solvent with elemental sulfur to so produce a sulfur loaded solvent, wherein the lean hydrocarbonaceous solvent comprises a plurality of monoaromatic and polyaromatic components;
   subjecting the sulfur loaded solvent to a catalytic hydrogenation step that converts at least some of the elemental sulfur to hydrogen sulfide and that preserves at least 95% of the plurality of monoaromatic and polyaromatic components to so produce a conditioned solvent; and
   wherein the conditioned solvent has an elemental sulfur carrying capacity that is higher than an elemental sulfur carrying capacity of the lean hydrocarbonaceous solvent,
   wherein the elemental sulfur is high-purity or pure.

2. The method of claim 1, wherein the plurality of monoaromatic and polyaromatic components in the lean hydrocarbonaceous solvent are present in an amount of between 35 wt % and 85 wt %.

3. The method of claim 1, wherein the lean hydrocarbonaceous solvent is a diesel oil or a light cycle oil.

4. The method of claim 1, wherein the temperature of the catalytic hydrogenation step is between 150° C. and 350° C.

5. The method of claim 1, wherein the temperature of the catalytic hydrogenation step is between 170° C. to 210° C. when performed with a molybdenum catalyst, or wherein the temperature of the catalytic hydrogenation step is between 295° C. to 335° C. when performed with a cobalt-molybdenum catalyst.

6. The method of claim 1, wherein the elemental sulfur carrying capacity of the conditioned solvent is at least 10% greater than the elemental sulfur carrying capacity of the lean hydrocarbonaceous solvent.

7. The method of claim 1, wherein the elemental sulfur carrying capacity of the conditioned solvent is at least 20% greater than the elemental sulfur carrying capacity of the lean hydrocarbonaceous solvent.

8. A method of improving sulfur removal from a sulfur-containing production stream, comprising:
  forming a conditioned solvent by loading a lean hydrocarbonaceous solvent having a plurality of monoaromatic and polyaromatic components with elemental sulfur to produce a sulfur loaded solvent and by catalytic hydrogenation of the sulfur loaded solvent;
  wherein the catalytic hydrogenation converts at least some of the elemental sulfur in the sulfur loaded solvent to hydrogen sulfide while preserving at least 95% of the plurality of monoaromatic and polyaromatic components, and wherein the conditioned solvent has an elemental sulfur carrying capacity that is higher than an elemental sulfur carrying capacity of the lean hydrocarbonaceous solvent; and
  contacting the sulfur-containing production stream with the conditioned solvent to produce a rich solvent and a treated production stream,
  wherein the elemental sulfur is high-purity or pure.

9. The method of claim 8, further comprising subjecting the rich solvent to catalytic hydrogenation under conditions substantially the same as those used for forming the conditioned solvent.

10. The method of claim 8, wherein the elemental sulfur is obtained from the sulfur-containing production stream.

11. The method of claim 8, wherein the conditioned solvent comprises at least 20% of the rich solvent after catalytic hydrogenation.

12. The method of claim 8, wherein the conditioned solvent is the rich solvent after catalytic hydrogenation.

13. The method of claim 8, wherein the catalytic hydrogenation is performed using a molybdenum catalyst and/or cobalt-molybdenum catalyst at a hydrogen partial pressure of between 50-200 psia and a temperature of between 170° C. and 335° C.

14. The method of claim 8, wherein the elemental sulfur carrying capacity of the conditioned solvent is at least 10% greater than the elemental sulfur carrying capacity of the lean hydrocarbonaceous solvent.

15. The method of claim 8, wherein the elemental sulfur carrying capacity of the conditioned solvent is at least 20% greater than the elemental sulfur carrying capacity of the lean hydrocarbonaceous solvent.

16. The method of claim 1, wherein the catalytic hydrogenation step is performed using a molybdenum catalyst and/or cobalt-molybdenum catalyst at a hydrogen partial pressure of between 50-200 psia.

17. The method of claim 1, further comprising:
  contacting a sulfur-containing production stream with the conditioned solvent to produce a rich solvent and a treated production stream.

18. The method of claim 17, further comprising:
  subjecting the rich solvent to catalytic hydrogenation under conditions substantially the same as those used for forming the conditioned solvent.

19. The method of claim 1, wherein the elemental sulfur is obtained from the sulfur-containing production stream.

20. The method of claim 8, wherein the lean hydrocarbonaceous solvent is a diesel oil or a light cycle oil.

* * * * *